Oct. 19, 1948.　　J. F. O'BRIEN ET AL　　2,451,506
BACK CONNECTION FEED UNIT
Filed Nov. 29, 1944　　2 Sheets-Sheet 1
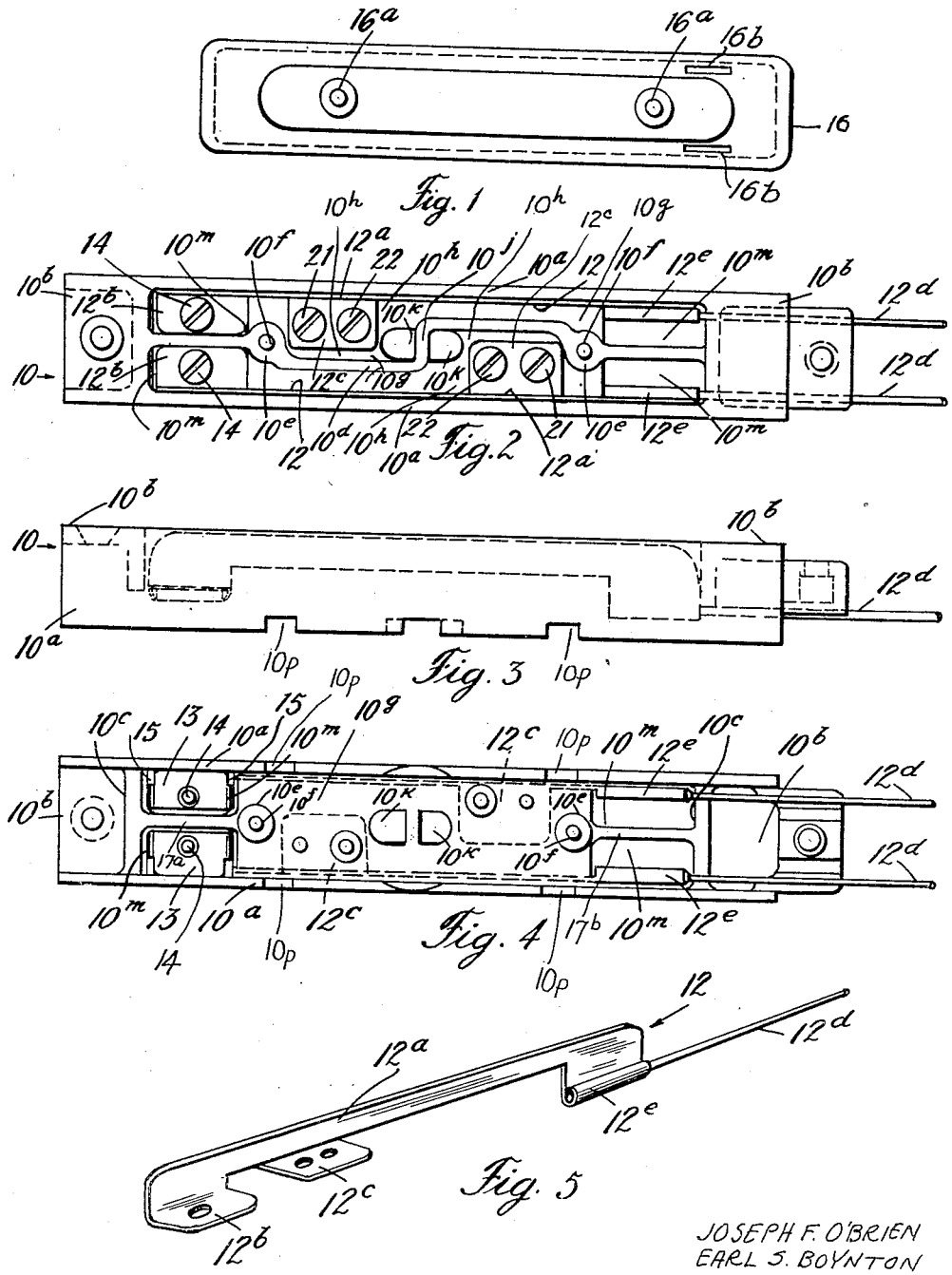
JOSEPH F. O'BRIEN
EARL S. BOYNTON
INVENTORS
ATTORNEY Oct. 19, 1948.　　　　J. F. O'BRIEN ET AL　　　　2,451,506
BACK CONNECTION FEED UNIT
Filed Nov. 29, 1944　　　　　　　　　　　　2 Sheets-Sheet 2
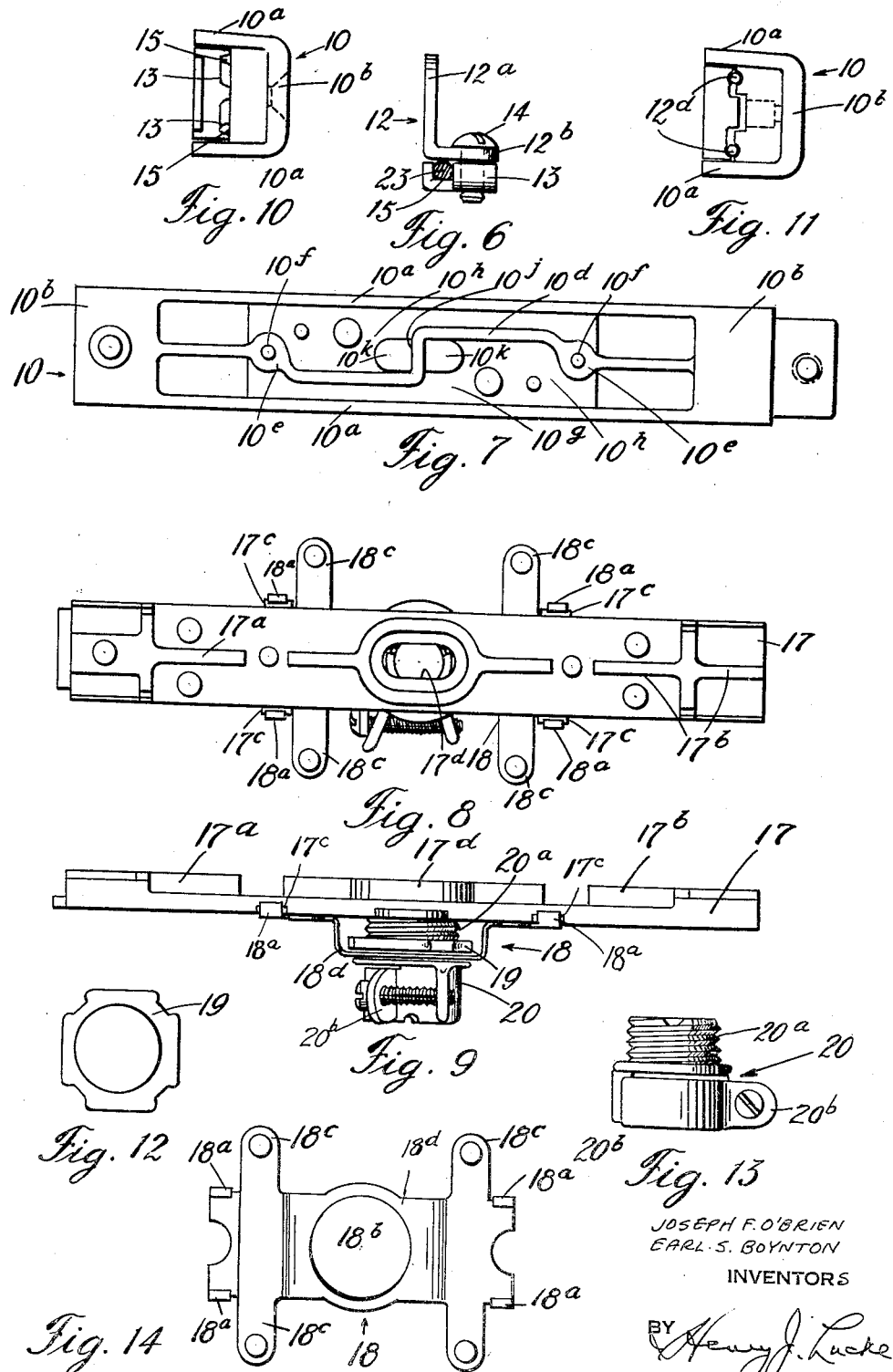
JOSEPH F. O'BRIEN
EARL S. BOYNTON
INVENTORS
BY Henry J. Lucke
ATTORNEY Patented Oct. 19, 1948

2,451,506

UNITED STATES PATENT OFFICE 2,451,506

BACK CONNECTION FEED UNIT

Joseph F. O'Brien, Lebanon, and Earl S. Boynton, East Orange, N. J., assignors to John B. Pierce Foundation, New York, N. Y., a corporation of New York Application November 29, 1944, Serial No. 565,724

1 Claim. (Cl. 173—334.1)

The present invention relates to supply or feed sections particularly arranged for seriatim electrical conduit systems.

More specifically, the present invention is directed to supply sections or feed units affording connection with the power lines through the back of the sections, as distinguished, for example, from those sections wherein the power lines are brought in through an end or a side of the section.

An objective of the present invention is to provide a section so conformed and constructed that it is capable of installation into the seriatim system in the same manner, except for its back connections, as the other units of such system, and that it be symmetrical with such other units, so as to give a uniform appearance to the whole of the conduit system.

Seriatim electrical conduit systems of the type generally comprise a feed or supply section, to which the power lines are directly connected, conductor or bus units, and outlet units. Generally, the outlet units resemble the conductor or bus units, except that they are provided with apertures through which the prongs of a plug are inserted for connecting with electrical contact elements attached to the conductors of such section.

The sections usually each may comprise a housing terminating at one end in a male extension and at the other in a complementary female extension, to afford telescopic mechanical connection and for effecting series connection of the electrical conductors. Frequently, the electrical conductors of such sections are solid wires.

A feature of the present invention is the provision of a bracket which is adapted to be attached to the feed section proper as well as to carry and support the screw-clamp or coupling for engaging the BX cable of the power line.

An object of the invention is to provide means for tightly securing such bracket to the feed section.

A feature of the present invention is to provide means for isolating the wires of the power line which are brought into the section to be connected to the respective conductors thereof.

An object of the present invention is to provide conductors within the feed section which are capable of large current carrying capacity. To this end, the power lines are brought in and connected to broad bus bars, which are securely enclosed within the section.

Provision is made for electrical connection of such bus bars with solid conductor wires of an adjoining section of the conduit system.

Provision is also made for isolating within the feed section the respective bus bars from each other throughout their entire lengths.

Further features and objects of the invention will be apparent from the following detailed description and the accompanying drawings, in which Fig. 1 is a bottom view of the cover-plate of the housing of a supply section pursuant to the invention;

Fig. 2 is a side elevation of the housing with its cover-plate and its closure base plate removed, showing the disposition of the bus bars and conductors therein;

Fig. 3 is a top plan view of Fig. 2;

Fig. 4 is a side elevation of the housing, opposite to that of Fig. 2;

Fig. 5 is a perspective of one bus-bar and conductor employed in such supply section;

Fig. 6 is an enlarged detail view of a clamping member shown connected with an electrical conductor of an adjoining section;

Fig. 7 is a view of the housing similar to Fig. 2, its bus-bars and other parts being removed.

Fig. 8 is an inside view of the closure base plate having attached thereto a bracket and a BX cable coupling means;

Fig. 9 is an edge view of Fig. 8, showing the closure base plate, bracket and coupling assembly;

Fig. 10 is an end view of the female end of the assembled unit (minus the bracket and coupling);

Fig. 11 is an end view of the male end of said unit;

Fig. 12 is a detail of a nut employed for engaging the BX cable coupling;

Fig. 13 is an elevation of a standard BX cable coupling; and

Fig. 14 is a plan view of a bracket adapted to be attached to the section and for engaging the coupling shown in Fig. 13.

Referring to the several views of the drawings, the exemplified embodiment of the invention comprises a main casing member or housing proper 10 having two parallel walls 10a, 10a, joined at their top edges by horizontal portions 10b, 10b; at the ends of the walls joining the side walls and top portions are transverse walls 10c, 10c, from which transverse walls extends an elongated S-shaped longitudinal rib 10d, having bosses 10e, 10e, with holes 10f, 10f, passing therethrough. A horizontal mezzanine or intermediate level portion 10g connects the side walls and is integral with the transverse walls 10c, 10c, through the medium of the outer arms of the longitudinal rib 10d.

Such longitudinal rib 10d, by its elongated S-shape between its outer arms, provides two mutually isolated compartments 10h, 10h, in which are arranged to be disposed the flanged parts of bus bars described more particularly hereinafter. At each side of the transverse part 10j of the rib 10d is an opening 10k; through these openings are passed the leads of the power cable, as is explained more fully hereinafter. Recesses 10m, 10m, are provided in the mezzanine portion for accommodating other flanged portions of the bus bars and their clamping members, and also the lug portions attached to the bus bars and their clamping members, as well as the electrical contact elements which may be attached to the conductors when the feed section is to function also as an outlet section.

Referring now more particularly to the bus bars 12, 12, each comprises a flat metal member having a longitudinally extending portion 12a arranged to snugly hug an inner side wall of the housing. Said member is bent at right angles to its portion 12a, to form its flanged parts 12b and 12c respectively, the former being disposed in an opening 10m, while the latter is arranged to lie within a compartment 10h. The ends of the bus bars opposite those having the flanged portions have soldered thereto cylindrical conductors 12d, 12d. These conductors are joined to the bus bars at their lugs indicated at 12e, 12e, and such lugs may be utilized as electrical outlet elements for connection thereto by means of an electrical plug, the prongs of which pass via slots 16b, 16b in the cover 16 and into the openings 10m, 10m in the housing proper.

To adapt the supply or feed section for mechanical and electrical connection with adjoining sections of a seriatim electrical conduit system, the conductors 12d, 12d, two in number in the instance of the illustrated embodiment, project beyond the male end, see Figs. 2, 3 and 4, of the supply or feed unit, to be received within suitable sockets or the like attached to like polar conductors of the next adjoining section. For connection at the female end of the supply or feed section with the thereat adjoining section having its conductors projecting beyond its male end, suitable means are provided for electrical connection with the respective bus bars 12, 12, such as the clamping plates 13, 13, see Fig. 6, and screws 14, 14. As shown, each clamping plate 13 has three upturned edge flanges, see also Fig. 10, to provide clearances 15, 15, for the reception and securement therein of the end of a conductor (indicated at 23, in Fig. 6) of the next adjoining section.

In order to gain access to the bus bars of the housing proper 12 and the connections thereto, a removable cover 16 is provided having holes 16a, 16a, which are arranged to register, when the cover 16 is in position, with the holes 10f, 10f, in the bosses 10e, 10e. The cover is secured in place by means of screws (not shown) passing through such registered holes.

A closure plate 17, see Figs. 8 and 9, is provided for the housing proper 10, the closure plate having a longitudinal ridge 17a adjacent one of its ends which, when in position, serves to isolate the clamping members 13, 13, from one another. For like purposes, the longitudinal ridge 17b at the opposite end of the base plate 17 serves to isolate the conductors 12d, 12d.

Extending from the lateral sides of the base plate 17 are projecting portions 17c, 17c, which are arranged to be engaged by the grips 18a, 18a of a bracket 18, see Figs. 8 and 14. The bracket 18, as shown in Fig. 14, comprises a substantially flat portion 18d having a central opening 18b, and also extensions 18c projecting in opposing directions at each end of the bracket 18, its central body portion 18d being offset with respect to the plane of the extensions 18c, as clearly appears in Fig. 9, to provide a clearance to accommodate a nut 19 and the threaded end 20a of a conventional BX cable coupling 20, having the usual cable clamping screw engaging lugs such as the lug 20b. The assembly of the bracket 18 with the nut 19 and coupling 20, see Figs. 12 and 13, is secured to the feed section by engagement of the grips 18a of the bracket 18 with the projecting portions 17c of the base plate 17, then placing the base plate in proper relation with the housing proper 10 to locate the projecting portions 17c respectively within the recesses 10p of the housing proper, see Figs. 3 and 4, and upon securing the base plate to the housing proper, the end portions of the grips 18a are locked within the recesses 10p between the inner surface of the base plate 17 and the faces of the recesses 10p of the housing proper. The bracket 18 is firmly locked relative to the assembly by tightening the nut 19 with respect to the threaded end of the BX cable coupling 20.

The opening 17d of the base plate 17 affords entry of the leads of the supply cable, for connection respectively to the bus bars 12, 12.

Screws 21, 21, see Fig. 2, are provided for anchoring the flanges 12c, 12c of the bus bars to the mezzanine of the housing 12, and binding screws 22, 22, serve to connect the leads of the cable to the bus bars, namely, by connection of such screws 22, 22 with the indicated openings in the flanged parts 12c, 12c of the respective bus conductors 12.

What we claim is:

A feed unit of a seriatim electrical conduit system comprising a self-enclosed housing including a separable base member, said housing and said base member being formed of insulating material, said housing having a female formation at one end and a male formation at its opposite end, electrical conductors extending longitudinally into said housing and having their ends projecting from said male end formation, a longitudinal partition extending from the inner face of the front wall of said housing for isolating said electrical conductors, a set of recesses extending transversely of said housing, said recesses corresponding in number to the number of said electrical conductors, a number of bus conductors coextensive with said housing and corresponding to the number of said electrical conductors, said bus conductors being respectively connected to said electrical conductors at their respective ends inwardly of said housing, each of said bus conductors comprising a longitudinally extending flat strip portion, and further comprising at one end an arcuately configurated hollow arm arranged to receive the inward end of its associated electrical conductor, an opening formed in said base member through which power supply leads may pass, and apertures formed in said housing substantially in alignment with said arcuately hollow arms for the reception of the blades of an electrical connector plug.

JOSEPH F. O'BRIEN.
EARL S. BOYNTON.

REFERENCES CITED

The following references are of record in the file of this patent:

UNITED STATES PATENTS

| Number | Name | Date |
| --- | --- | --- |
| 2,345,234 | Carter, Jr. | Mar. 28, 1944 |
| 2,358,346 | O'Brien | Sept. 19, 1944 |
| 2,373,331 | O'Brien | Apr. 10, 1945 |